(12) United States Patent
Kisielewicz (10) Patent No.: US 12,044,298 B2
(45) Date of Patent: Jul. 23, 2024

(54) DIFFERENTIAL GEAR ASSEMBLY AND METHOD OF ASSEMBLING THE SAME

(71) Applicant: Volvo Car Corporation, Gothenburg (SE)

(72) Inventor: Rafal Kisielewicz, Olofstorp (SE)

(73) Assignee: VOLVO CAR CORPORATION, Gothenburg (SE)

( * ) Notice: Subject to any disclaimer, the term of this patent is extended or adjusted under 35 U.S.C. 154(b) by 0 days.

(21) Appl. No.: 17/472,129

(22) Filed: Sep. 10, 2021

(65) Prior Publication Data
US 2022/0090667 A1    Mar. 24, 2022

(30) Foreign Application Priority Data

Sep. 21, 2020   (EP) ..................................... 20197178

(51) Int. Cl.
*F16H 48/40*   (2012.01)
*F16H 48/08*   (2006.01)
(Continued)

(52) U.S. Cl.
CPC ............. *F16H 48/40* (2013.01); *F16H 48/08* (2013.01); *F16H 48/42* (2013.01); *F16H 2048/382* (2013.01); *F16H 2048/385* (2013.01)

(58) Field of Classification Search
CPC ........ F16H 48/08–2048/087; F16H 2048/382; F16H 2048/385
See application file for complete search history.

(56) References Cited

U.S. PATENT DOCUMENTS

| 1,264,890 A | * | 5/1918 | Buckwalter | F16H 48/08 475/246 |
| 1,422,512 A | * | 7/1922 | White, Jr. | F16H 1/00 475/229 |

(Continued)

FOREIGN PATENT DOCUMENTS

| CN | 101360932 A | 2/2009 |
| CN | 203363060 U | 12/2013 |

(Continued)

OTHER PUBLICATIONS

Extended European Search Report for European Application No. 20197178.5 dated Feb. 16, 2021, 10 pages.

*Primary Examiner* — Ernesto A Suarez
*Assistant Examiner* — James J Taylor, II
(74) *Attorney, Agent, or Firm* — Amin, Turocy & Watson, LLP (57) ABSTRACT

A differential gear assembly, and method for assembling such an assembly are provided. The differential gear assembly comprises a housing constructed of substantially identically shaped and sized housing plates, which each have an outer flange of a same diameter. The assembly further comprises an outer helical ring gear that is fixed to the housing, wherein outer helical ring gear comprises an inner flange for mounting to the outer flange of the first or second housing plate, wherein an inner diameter of the inner flange is smaller than the outer diameter of the housing plates. The inner flange of the helical ring gear can thus be held, e.g. clamped, between the outer flanges of the housing plates. In an alternative embodiment, the outer flange of one of the housing plates is held between the inner flange of the ring gear and the outer flange of the other of the housing plates.

20 Claims, 6 Drawing Sheets

(51) Int. Cl.
    *F16H 48/38* (2012.01)
    *F16H 48/42* (2012.01)

(56) References Cited

U.S. PATENT DOCUMENTS

| | | | | |
|---|---|---|---|---|
| 1,461,102 | A * | 7/1923 | Sternbergh | F16H 48/08 475/230 |
| 1,657,091 | A * | 1/1928 | Morgan | F16H 48/08 475/226 |
| 6,116,108 | A * | 9/2000 | Sturm | F16H 48/08 74/447 |
| 6,176,152 | B1 * | 1/2001 | Victoria | F16H 48/08 475/230 |
| 6,623,396 | B2 * | 9/2003 | Szalony | F16H 48/08 475/901 |
| 6,981,929 | B2 * | 1/2006 | Janiszewski | F16H 48/08 74/606 R |
| 7,326,145 | B2 * | 2/2008 | Abraham | F16H 48/08 475/237 |
| 9,897,188 | B2 * | 2/2018 | Yanase | F16H 48/40 |
| 9,915,007 | B2 * | 3/2018 | Heitzenrater | F16H 57/02 |
| 2006/0135308 | A1 | 6/2006 | Abraham | |
| 2017/0299035 | A1* | 10/2017 | Wakui | F16H 48/08 |
| 2022/0205522 | A1* | 6/2022 | Jung | F16H 55/06 |

FOREIGN PATENT DOCUMENTS

| | | | |
|---|---|---|---|
| DE | 4441163 A1 | 10/1995 | |
| DE | 102007040479 A1 | 3/2009 | |
| JP | 2020094681 A | 6/2020 | |
| WO | 0023731 A1 | 4/2000 | |
| WO | WO-2014067017 A1 * | 5/2014 | ............ F16H 48/08 |
| WO | 2020069692 A1 | 4/2020 | |

* cited by examiner

DIFFERENTIAL GEAR ASSEMBLY AND METHOD OF ASSEMBLING THE SAME

CROSS-REFERENCE TO RELATED APPLICATIONS

This application claims priority to European patent application no. 20197178.5 filed Sep. 21, 2020. The entirety of the aforementioned application is hereby incorporated herein by reference.

TECHNICAL FIELD

The present disclosure relates to a differential gear assembly, e.g. for connecting to wheel axles of a car or truck, comprising a housing for housing therein a first pair of gears which are rotatable relative to the housing around a first common axis of rotation and a second pair of gears which engage the first pair of gears and are rotatable relative to the housing around a second common axis of rotation, wherein the housing comprises a first housing member and a second housing member, and wherein the differential gear assembly further comprises a helical ring gear having a transverse gear plane. The first pair of gears typically are side gears, and the second pair of gears typically are pinion gears which have a smaller diameter than the side gears.

Examples of helical gears include a single helical gear, a double helical gear, and a herringbone gear. The disclosure further relates to a method of assembling a differential gear assembly.

BACKGROUND ART

A differential gear assembly comprising a housing is known, wherein the housing comprises two housing members which attached to each other in abutting fashion, wherein the assembly is further provided with an outer ring gear that is welded to an outer side of one or both of the housing members. A drawback of the known differential gear assembly is that attaching ring gear to the housing members is complex and therefore relatively expensive.

It is an object of the invention to provide a differential gear assembly which can be manufactured more easily, and a method for more easily manufacturing a differential ring gear assembly.

SUMMARY OF THE INVENTION

According to a first aspect the present disclosure provides a differential gear assembly comprising: a housing comprising a first housing plate and a second housing plate; a first pair of gears of which each gear is mounted rotatably around a first axis of rotation and within the housing; a second pair of gears of which each gear is mounted rotatably around a second axis of rotation and within the housing while engaging the gears of the first pair of gears, wherein the second axis of rotation is normal to the first axis of rotation; wherein the first and second housing plate have a substantially identical shape and size, said housing plates each comprising an outer flange having substantially a same outer diameter; the differential gear assembly further comprising an outer helical ring gear that is fixed to the housing, wherein the outer helical ring gear comprises an inner flange for mounting to the outer flange of the first and/or second housing plate, wherein an inner diameter of the inner flange is smaller than the outer diameter of the housing plates.

As the housing plates are substantially identical in shape, manufacturing of the housing of the gear assembly is simplified. The helical ring gear is formed separately from the housing plates and can thus be easily machined to within highly precise manufacturing tolerances, while the housing plates may be made from a different material than the ring gear and/or may be manufactured to less high manufacturing tolerances. The ring gear being manufactured separate from the housing plate also allows the ring gear and housing plates to be made from different materials that are not easily welded to each other. For instance, the housing plates could comprise, or be made of, cast metal alloy, a ceramic material, or even a carbon fiber material, while the helical ring gear could comprise, or be made of, a steel alloy e.g. as defined in table 3 of DIN EN 10083-2:2006. By clamping the one or both housing plates against the flange of the helical ring gear, e.g. using bolts, the axis of rotation of the helical ring gear is automatically aligned to be parallel to the axis of rotation of the housing, in this manner further facilitating assembly of the differential gear assembly.

The invention allows the teeth of the helical gear can be subjected to heat treatment and/or coated with a hardening layer, completely independent from the first or second housing plate.

If inner flange of the helical ring gear is held between the first and second housing plat, the ring gear may be fixed with respect to the housing without requiring welds or the like.

An additional advantage is that helical ring gears which have different outer diameters can be used with the same housing plates, as long as the inner flanges of these helical ring gears can be attached to the housing. In this manner, the same housing plates may be used to construct differential gear assemblies with helical ring gears having different outer diameters.

In addition, due to the plates being of such a similar construction, the resulting housing may have a substantially symmetrical weight distribution, and the center of mass of the entire assembly, including the outer helical ring rear, may substantially coincide with the intersection of the first and second axis of rotation. Preferably, each housing plate is substantially mirror symmetrical in a plane parallel to and through the first axis of rotation. More preferably, the first and second housing plate are interchangeable, i.e. the first housing plate can take the place of the second housing plate in the differential gear assembly, and vice versa.

In an example, the gears of the second pair of gears are rotatably mounted on a gear shaft, wherein the gear shaft comprises a shaft portion with a non-circular cross-section, and wherein the first and/or second housing plate comprise a receiving portion for receiving said shaft portion with some play in such a manner that rotation of the gear shaft with respect to the housing is substantially blocked. Thus, rotation of the gear shaft relative to the housing is substantially blocked by the mating shapes of the shaft portion(s) of the shaft and the corresponding receiving portion(s) of the housing plate(s). Thus, when the housing plates are clamped towards each other, substantially no clamping force is exerted on the gear shaft, so that the gear shaft does not block correct alignment of the housing plates. The gear shaft may for instance be arranged in the housing such that a small (e.g. less than 1 mm) translational movement of the gear shaft in a plane normal to the second axis of rotation remains possible.

Preferably the gear shaft is arranged completely within the interior of the housing between facing sides of the first and second housing plate, e.g. so that no part of the shaft extends through the outer surface of the housing plates. As rotation of the gear shaft relative to the housing is substantially blocked, no access to the gear shaft from outside of the housing is required. In particular, no through holes have to be provided in the housing from the outside of the housing to the shaft to allow a locking pin or the like to be attached to the shaft to prevent the shaft from rotating. Moreover, when the shaft is completely contained in the housing, the inner flange of the helical gear can extend to a position close to the shaft, allowing for a more compact construction of the differential gear assembly.

In an example the second axis of rotation intersects the external gear mesh of the helical ring gear. A force exerted on the helical ring gear can thus be transmitted from the ring gear in substantially the same plane in which the axis of rotation of the second pair of gears is arranged, so that torque on the housing outside of said plane is reduced. Preferably, a plane through the second axis of rotation and normal to the first axis of rotation divides the gear mesh of the helical gear into two mesh portions having substantially equal heights along the first axis of rotation.

In an alternative example, the gear mesh is arranged completely on one side of a plane through the second axis of rotation and normal to the first axis of rotation. In this case a portion of one housing plate may for instance be clamped between the ring gear and a portion of the other the housing plate.

In an example, the inner flange may be provided with openings, and each of said outer flanges may be provided with a number of through openings for bolts to connect the housing plates together, with the through openings of the housing plates being aligned with the openings in the flange of the helical ring gear. Bolt connections provide a simple way to clamp the inner flange between the housing plates.

In an example the outer flange of each of the housing plates is provided with a circumferential ridge having a circumferential side surface for aligning the inner flange of the helical ring with the housing plate. The circumferential ridges of the first and second mounting plate remain spaced apart when the assembly is in an assembled state. During assembly, the ridges help to radially align the one or both of the housing plates relative to the inner flange around the first axis of rotation.

In an example facing sides of the first and second housing plate are spaced apart from each other at a distance by the inner flange of the helical gear ring. The distance between the plates is thus determined by the thickness of the inner flange, ensuring that the inner flange of the helical ring gear can be tightly clamped between the housing plates.

In an embodiment, each of the housing plates defines a first through-opening for passage of an axle for rotation fixed connection to one of the first pair of gears, and an opposite second through-opening, the first opening having a circumferential edge comprising a first diameter and the second opening having a circumferential edge comprising a second diameter which is larger than the first diameter, wherein the housing, when assembled, comprises an outward facing side and an opposite inward facing side which faces the first and second pairs of gears, wherein no other through opening than the second through opening has a dimension that allows passage of the first and second gears from the outward facing side to inward facing side.

The housing, when assembled, thus can be structurally as robust the housing plates are free from large openings from the exterior to the interior other than the first and second through-openings. Relatively small through openings, i.e. having opening surfaces smaller than the maximum dimensions of the first and second gears, may be provided in the housing plates, e.g. to allow passage of lubricant such as oil between the interior of the housing and the exterior of the housing. However, except at the opening, the inner surface preferably is free of through-holes that extend from the inward facing side to the outward facing side. Here a through hole means a hole which extends through the thickness of the housing plate from the inward facing side to the outward facing side, and has a circumferential edge.

In an example the first and second housing plates and the inner flange of the helical gear ring together substantially seal off the interior of the housing except for at the through openings. For instance, when the inner flange has a circumferential inner wall, this wall and the outer flanges of the housing plates may abut in a sealing manner.

In an example the outer helical ring gear comprises an external gear mesh with teeth, preferably wherein said teeth have tips which point radially outwards from the first axis of rotation.

In an example the housing plates are cast from a first material, and the inner flange and/or teeth of the helical ring gear comprise a second material which is harder than the first material. The housing plates can thus be forming using casting or stamping, wherein optionally the surface of the outer flanges of the housing plates are machined to be smoothly planar. In this manner, the outer flanges can smoothly abut the inner flange of the helical ring gear. Preferably the inner flange and/or teeth of the helical ring gear are machined from a monolithic block of material, such as a metal alloy. Hardness of the housing plates, and of the inner flange and teeth of the helical gear ring may for instance be determined according to the Vickers hardness test described in ISO 6507-1:2018.

In an example the inner flange of the helical ring gear is clamped between the outer flanges of the housing plates. Preferably, the outer diameters of the outer flanges are greater than length of the gear shaft on which the second pair of gears is rotatably mounted.

In an embodiment each housing plate comprises on its inner side a cylindrical section near its through opening for the wheel axle, and widens from the cylindrical section towards its outer flange, wherein the gears of the first pair of gears have an maximum outer diameter which is greater than the inner diameter of the circular section. The gears of the first pair of gears thus cannot move out of the housing when the inner flange of the ring gear is clamped between the housing plates. Preferably, the cylindrical section of each housing plate transitions, via an annular surface that extends substantially parallel to the outer flange, to a spherical segment, wherein the spherical segment merges into the outer flange. In this manner a particularly compact housing can be constructed.

In an example the helical ring gear is a unitary helical ring gear, preferably machined out of a single block of material. Such a unitary gear may be manufactured free from welds and the like which alter the strength characteristics of the gear, though in some instances the helical gear may be welded to the housing.

According to a second aspect, the disclosure provides a method for assembling a differential gear assembly, comprising: providing a first housing plate and a second housing plate having a substantially identical shape and size, said housing plates each comprising an outer flange having a substantially same outer diameter; providing a helical gear comprising an inner flange having a diameter that is smaller than the outer diameter of the outer flanges of the housing plates; arranging a first pair of gears and a second pair of gears in the first and/or or second housing plate in such a manner that each gear of the first pair of gears engages each gear of the second pair of gears; and fixing the outer flanges of first and second housing plate relative to the inner flange of the helical ring gear to form a housing of the differential gear assembly. Preferably the method is carried out to manufacture a differential housing according to the first aspect of the invention.

When the inner flange is to be clamped between the outer flanges of the housing plates, generally first one gear of the first pair of gears is arranged in a first housing plate, after which the second gears are arranged to be supported on the first housing plate, and subsequently the second gear of the first pair of gears is arranged into engagement with the second pair of gears. Prior, during or after to arranging the gears in the first housing plate, the helical ring gear can be arranged with its inner flange against the outer flange of the first housing plate. Finally, the second housing plate is arranged with its outer flange against the inner flange, and the housing plates are clamped together, e.g. using bolts and nuts.

If an outer flange of one of the housing plates is to be clamped between the inner flange of the ring gear and the outer flange of the other housing plate, then the gears may be arranged in the housing, after which the helical ring gear is arranged with its inner flange against the outer flange of one of the housing plates while said outer flanges spaces the inner flange apart from the outer flange of the other housing plate. The housing plates and helical gear can then be clamped together, e.g. using bolts or nuts.

In either case, the gears of the second pair of gear may be rotatably mounted on a gear shaft, wherein said gear shaft has comprises a shaft portion with a non-circular cross-section, wherein the step of arranging the second pair of gears comprises arranging the gear shaft in such a manner that the shaft portion is received in the first and/or second housing plate with some play and in such a manner that rotation of the gear shaft with respect to the housing is substantially blocked.

BRIEF DESCRIPTION OF THE DRAWINGS

The present invention will be discussed in more detail below, with reference to the attached drawings, in which.

DESCRIPTION OF EMBODIMENTS

Figure 1A:
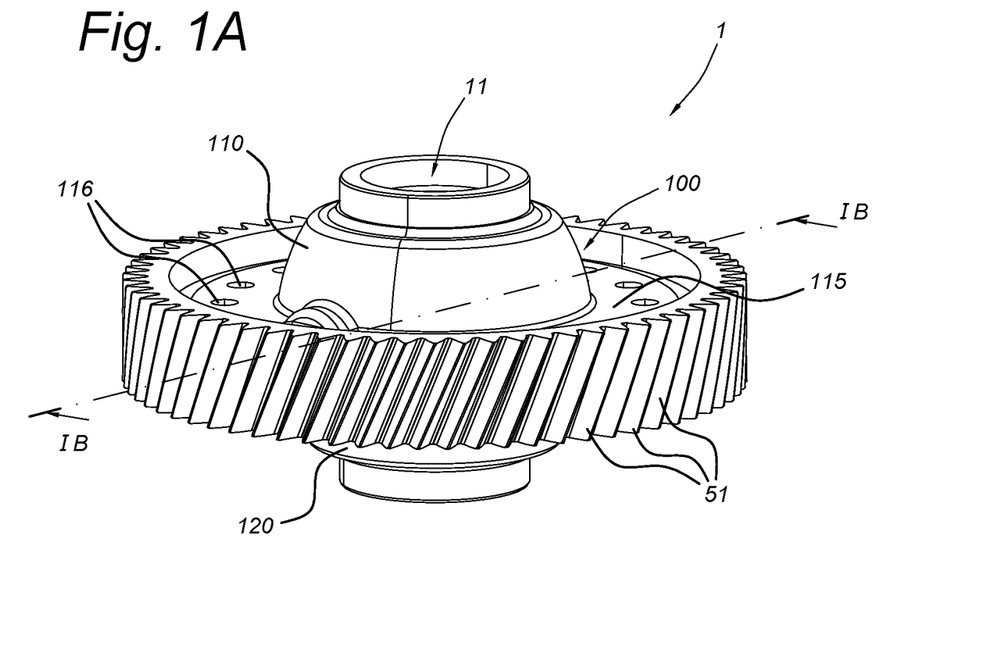
FIG. 1A shows an isometric view of a gear assembly according to the disclosure.
Figure 1B:
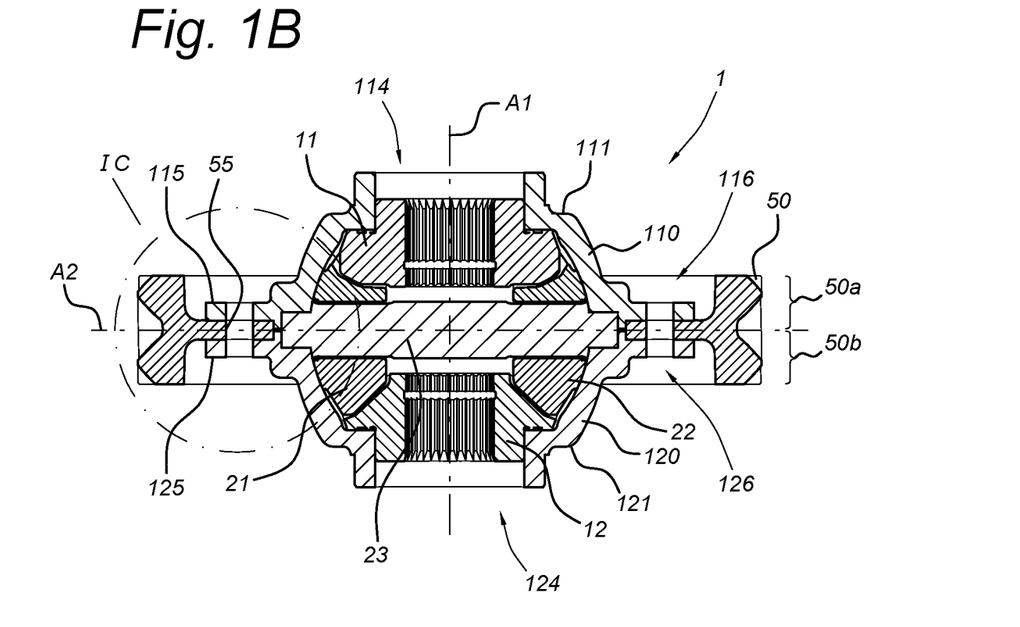
FIG. 1B shows a cross-sectional side view along plane IB-IB of FIG. 1A, illustrating that the helical gear is clamped between two housing plates which form a housing of the assembly.

FIGS. 1A and 1B show an isometric view of a differential gear assembly 1 according to the disclosure, and a cross-sectional side view thereof. The assembly 1 comprises a housing 100 with two housing plates 110, 120 formed by casting and which are shaped substantially identically, and for instance may have been formed using a same mold. The housing plates 110, 120 are provided with through-openings 114, 124 for passage of respective wheel axles of a vehicle to connect to gears 11, 12 that are arranged in the housing, so that the wheel axles can be rotation fixedly connected to these gears 11,12. The gears 11 and 12 are each rotatable relative to the housing 100 around a first axis of rotation A1.

FIG. 1B shows that the gears 11, 12 are each provided with an opening for receiving such a wheel axle therein, with splines arranged on the inner circumference of the opening to ensure the gear remains rotationally fixed to its wheel axle. The gears 11, 12 engage gears 21, 22 which are supported on a gear shaft 23 which is arranged within the housing 100. The gears 21, 22 are each rotatably mounted on the gears shaft 23, i.e. each gear 21, 22 can rotate with respect to the shaft 23, and are each rotatable relative to the housing 100 around a second axis of rotation A2 which is perpendicular to the first axis of rotation A1.

The differential gear assembly 1 further comprises an outer helical ring gear 50 which has an external gear mesh with teeth 51 that point radially outward from the first axis of rotation A1. On either side of a plane P which extends through the second axis of rotation A2 and normal to the first axis of rotation A1, the gear comprises a mesh portion 50a, 50b with substantially equal heights along the first axis of rotation. The differential gear assembly 1 thus has a substantially symmetrical construction and weight distribution.

The helical ring gear 50 is fixed to the housing 100 and is clamped between housing plates 110, 120. The housing plates 110, 120 can be clamped together for instance using bolts which pass through through-openings 116, 126 in the housing plates. For reasons of clarity such bolts are not shown in FIGS. 1A and 1B, though an example of a bolt-and-nut connection as is typically used is shown in FIG. 1C.

Figure 1C:
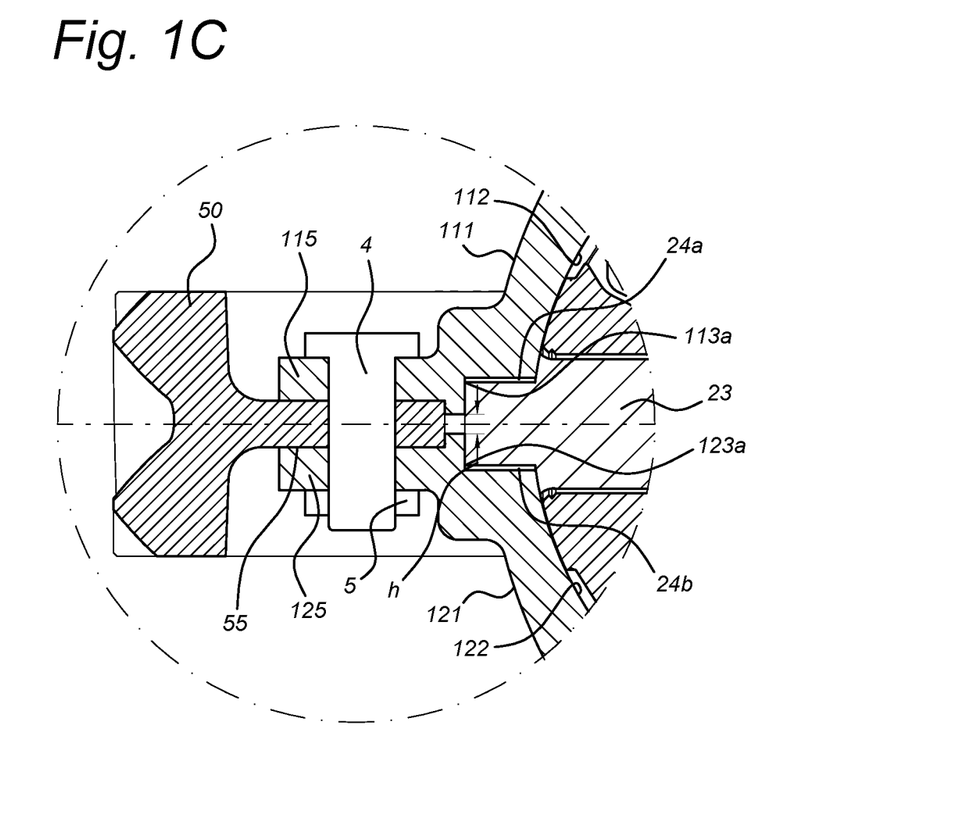
FIG. 1C shows a detail of portion IC of FIG. 1B.

In FIG. 1C, which shows a detail of section IC of FIG. 1B, it can be seen more clearly that the inner flange 55 of the helical gear ring 50 is clamped between outer flanges 115 and 125 of the housing plates 110, 120. For clamping the helical gear ring 50 between the housing plates a bolt 4 and nut 5 connection is provided, with the bolt 4 passing through aligned through-openings in outer flanges 115, 125 of the housing plates 110, 120 and in inner flange 55 of the helical ring gear, with the head of the bolt 4 and the nut 5 applying a clamping force on the outer flanges 115, 125 and the inner flange 55. The housing plates 110, 120 and the inner flange 55 of the helical ring gear are shaped such that the inner flange 55 spaces the housing plates apart by a distance h. This ensures the inner flange can be clamped sufficiently tightly.

The interior gear shaft 23 on which the gears 21, 22 are rotatably mounted, is accommodated on the inner side of the housing 100 in receiving portions 113a, 123a and 113b, 123b of the first and second housing plates 110, 120. The distance h also determines the distance between receiving portions 113a and 123a, and receiving portions 113b, and thus how tightly the shaft 23 is held in the housing. The gear shaft 23 comprises an end portion 24 which has a non-circular cross-section, so that when then end portion 24 is held between receiving portions 113, 123a, the gear shaft is substantially prevented from rotating around axis A2 relative to the housing plates of the housing. Both ends of the gear shaft 23 are received in the corresponding receiving portions with some play, so that the inner flange 55 of the helical gear ring can be tightly clamped between the outer flanges 115 and 125 of the housing plates, without clamping force being exerted on the gear shaft 23.

Figure 1D:
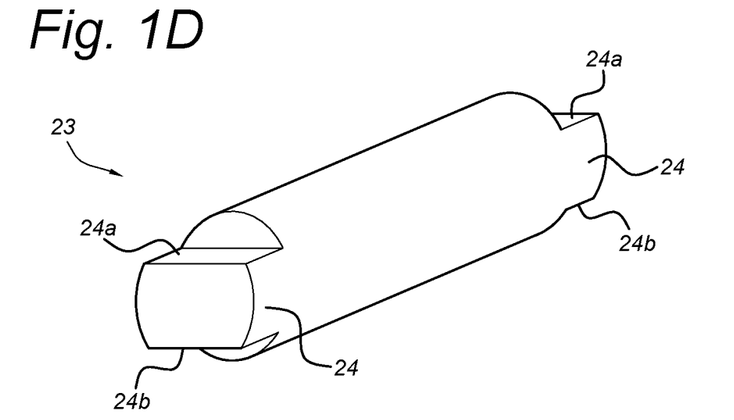
FIG. 1D shows an isometric view of a gear shaft of FIGS. 1A-1C.

FIG. 1D shows an isometric view of the detail gear shaft 23, with its end portion 24 having two planar flat surfaces 24a, 24b for preventing the shaft from rotating in the housing. The gear shaft 23 can thus be placed completely within the housing, and no locking pin or the like for fixing the shaft relative to the housing is required. In particular, the housing plates can remain free from through openings for passage of the shaft 23, or for passage of a locking pin or the like for locking the shaft 23 with respect to the housing plates.

Figure 2A:
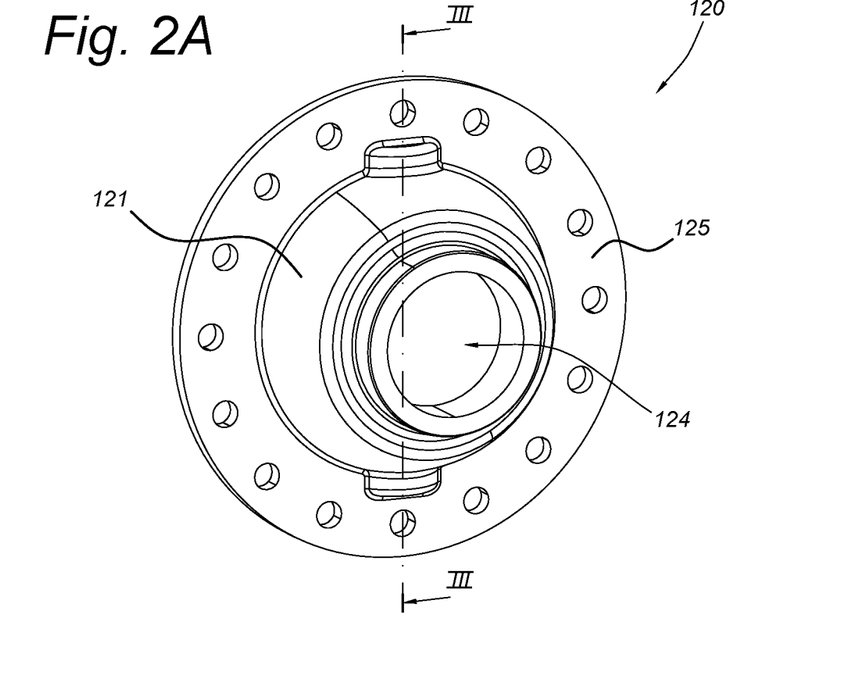
FIGS. 2A and 2B respectively show an inner and outer side view of a housing plate of the gear assembly of FIG. 1A.
Figure 2B:
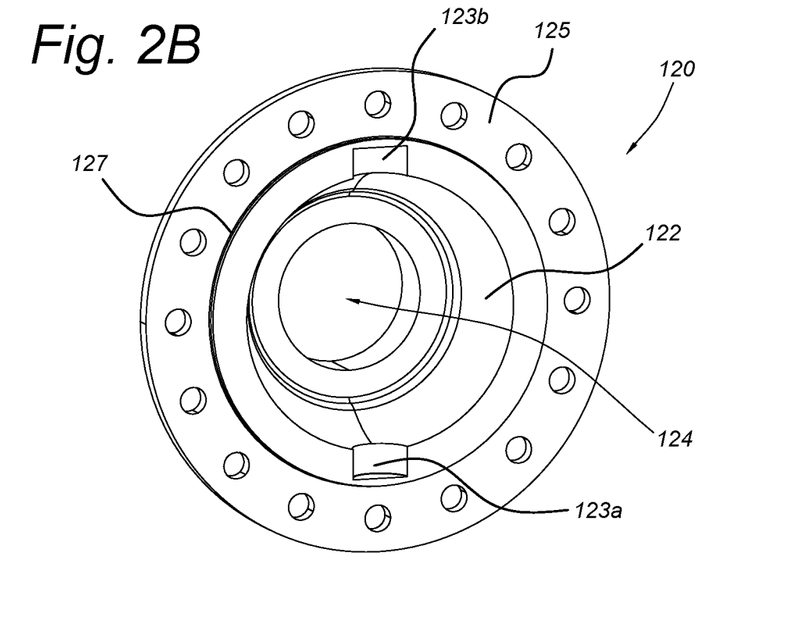

FIGS. 2A and 2B show an isometric outer and inner view of the housing plate 120, in which respectively the outer surface 121 and inner surface 122 are visible. Except for at the opening 124 and at its open side near the flange 55, the inner surface 122 is solid, i.e. is free from through openings through which dust or dirt may enter through the housing plate 120 from the exterior thereof into the interior thereof. Thus, when the differential gear assembly 1 is assembled, the housing plate 120, the substantially identically shaped housing plate 110 and the circumferential inner flange of the gear ring that is held therebetween, together substantially seal off the interior of the housing except for at the openings 114, 124. Dust is in this manner substantially prevented from passing from the exterior of the housing to the interior thereof, and any lubricant, such as oil, that is provided in the housing to lubricate the gears is substantially prevented from leaking out of the housing.

Figure 3:
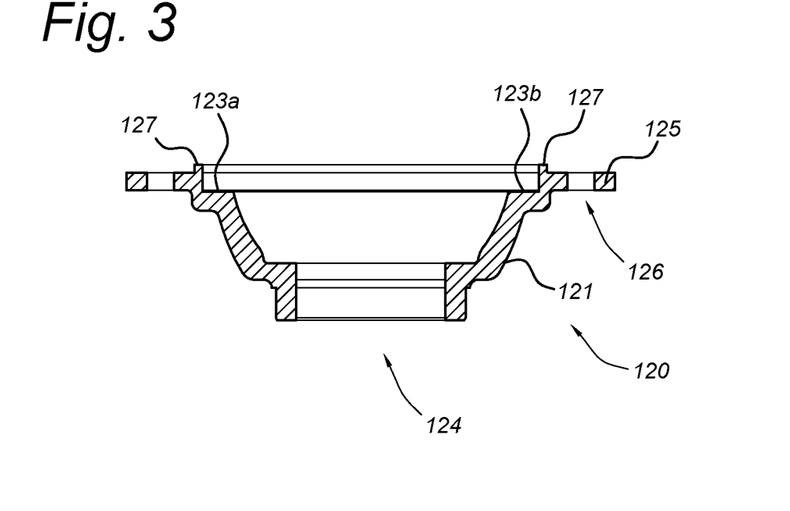
FIG. 3 shows a cross-sectional view of a housing plate of the gear assembly of FIG. 1A.

FIG. 3 shows a cross-sectional side view of the housing plate 120, which more clearly shows that the flange 125 is provided with a circumferential ridge 127. This a circumferential outer surface of this ridge 127 is arranged for abutting a circumferential inner surface of the inner flange of the helical ring gear, to facilitate aligning the ring gear with the housing plate. Referring back to FIG. 1C, when the housing plates clamp the ring gear therebetween, the ridges of the housing plates remain vertically spaced apart from each other.

Figure 4A:
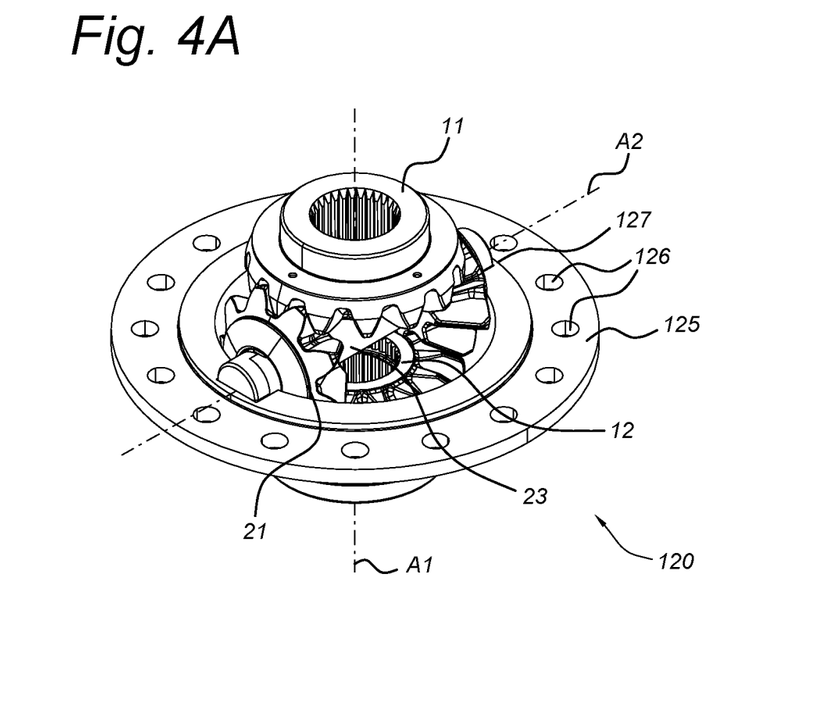
FIGS. 4A-4C illustrate steps of assembling a differential gear assembly of the disclosure.
Figure 4B:
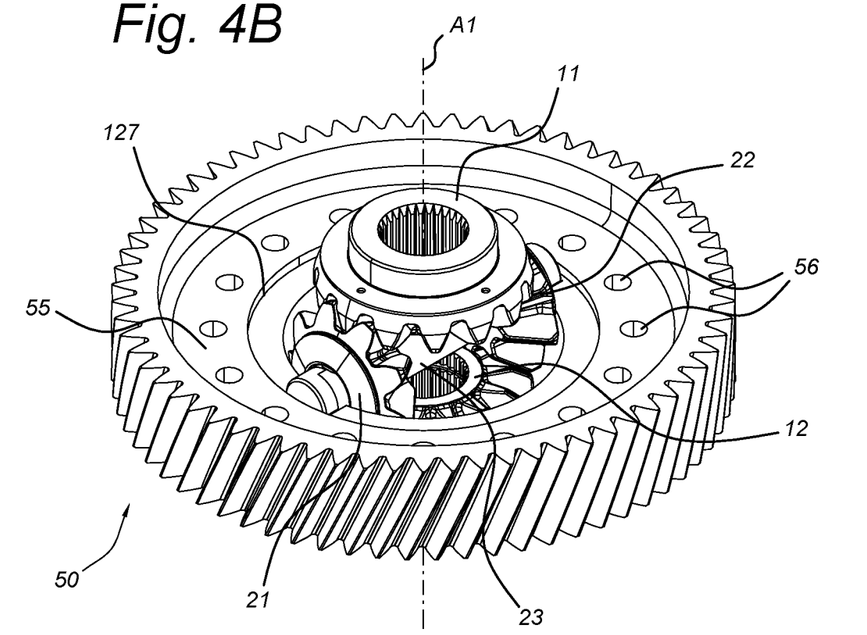
Figure 4C:
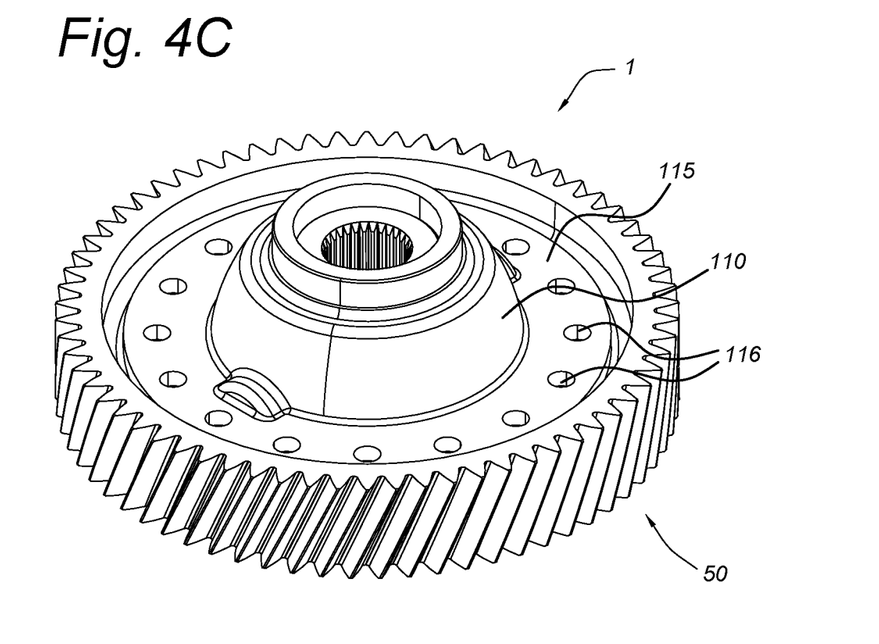

FIGS. 4A, 4B and 4C illustrate how a differential gear assembly of the disclosure may be assembled. First, as shown in FIG. 4A, a gear 12 is arranged in second mounting plate, after which shaft 23 on which gears 21, 22 are rotatably supported is arranged in the receiving portions 123a, 123b of the first housing plate in such a manner that the gear 12 and gears 21, 22 engage each other. Next, gear 11 is placed on top of gears 21, 22, in such a manner that the gear 11 and gears 21, 22 engage each other and the axis of rotation A1 of the gear 11 substantially coincides with the axis of rotation of the gear 12. FIG. 4B shows that next the helical ring gear 50 is placed with its inner flange 55 on the outer flange 125 of the housing plate 120. During said placement, the inner circumferential side surface of the inner flange 55 contacts the circumferential side surface of ridge 127 so that the axis of rotation of the helical ring gear 50 is aligned with the first axis of rotation A1. Next, the ring gear is rotated with respect to the housing plate 120 around the first axis until the through openings 56 in the inner flange 55 are aligned with the though openings 126 in outer flange of the housing plate 120.

In FIG. 4C, the first housing plate is placed with its outer flange 115 on the inner flange of the helical ring gear. Similar to the manner in which the second housing plate 120 is aligned with the ring gear 50, the first housing plate is radially aligned with respect to the ring gear 50 by means of a circumferential ridge on the outer flange of the first housing plate, after which the first housing plate is rotated relative to the ring gear 50 until the through openings 116 align with corresponding through openings 56 in the inner flange 55. As a final step (not shown), the housing plates are clamped together by inserting bolts through the opening 116, 56, 126 and tightening nuts to clamp the inner flange 55 between the outer flanges of the housing plates.

Figure 5:
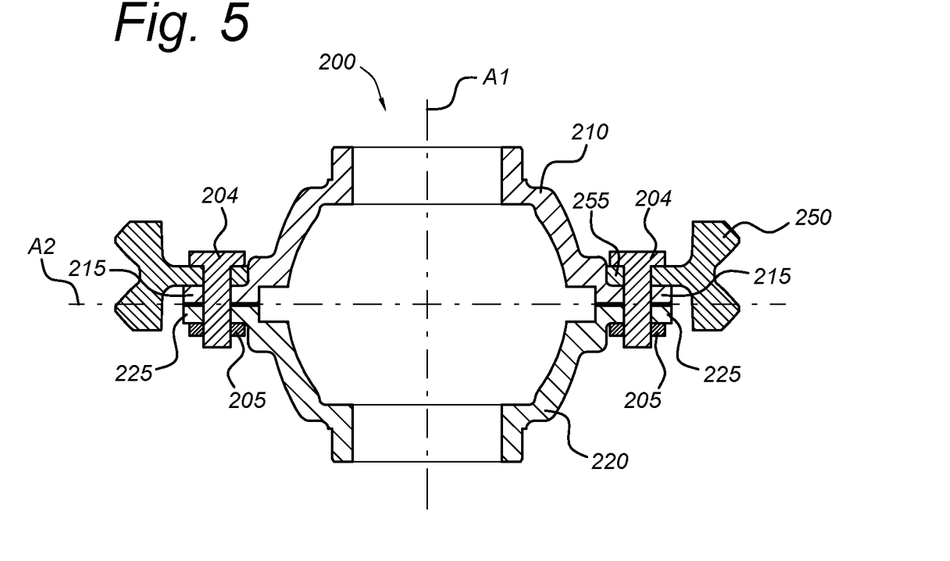
FIG. 5 shows another embodiment of a gear assembly according to the disclosure.

FIG. 5 shows a cross-sectional detail of an alternative embodiment of a differential gear assembly 200 according to the invention. Though in FIG. 5 the gears and gear axle have been omitted for reasons of clarity, it will be appreciated that assembly 200 will have gears and a gear axle similar to those shown in FIG. 1B. The assembly 200 comprises two housing plates 210, 220 which have a substantially identical shape and which abut each other. The assembly further comprises an outer helical gear ring 250 mounted one of the housing plates, such that outer flange 215 of one housing plate 210 is held between the inner flange 255 of the helical gear ring 250 and outer flange 225 of the other housing plate 220. Bolts 204, which extend through through openings in the inner flange 255 and outer flanges 215, 225, together with nuts 205 ensure that the housing plates and the helical ring gear are clamped together.

In summary, the disclosure provides a differential gear assembly, and method for assembling such an assembly. A differential gear assembly, and method for assembling such an assembly are provided. The differential gear assembly comprises a housing constructed of substantially identically shaped and sized housing plates, which each have an outer flange of a same diameter. The assembly further comprises an outer helical ring gear that is fixed to the housing, wherein outer helical ring gear comprises an inner flange for mounting to the outer flange of the first and/or second housing plate, wherein an inner diameter of the inner flange is smaller than the outer diameter of the housing plates. The inner flange of the helical ring gear can thus be held, e.g. clamped, between the outer flanges of the housing plates. In an alternative embodiment, the outer flange of one of the housing plates is held between the inner flange of the ring gear and the outer flange of the other of the housing plates. The housing plates and ring gear are preferably provided with through openings for passage of bolts for clamping clamp the ring gear and the housing plates together. However, it may also be envisaged to weld the ring gear to one or both of the housing plates.

The invention claimed is:

1. A differential gear assembly comprising:
   a housing comprising a first housing plate and a second housing plate, wherein the first housing plate and the second housing plate have a substantially identical shape and size, and each of the first housing plate and the second housing plate comprise a respective outer flange having substantially a same outer diameter;
   a first pair of gears mounted within the housing, wherein each gear of the first pair of gears is mounted rotatably around a first axis of rotation (A1);
   a second pair of gears mounted within the housing, wherein each gear of the second pair of gears is mounted rotatably around a second axis of rotation (A2), wherein the second pair of gears engage with the first pair of gears, and wherein the second axis of rotation (A2) is normal to the first axis of rotation (A1); and
   an outer helical ring gear that is fixed to the housing, wherein the outer helical ring gear comprises an inner flange for mounting to the respective outer flange of at least one of the first housing plate or the second housing plate, wherein an inner diameter of the inner flange is smaller than the outer diameter of the first housing plate and the second housing plate, wherein each gear of the second pair of gears is rotatably mounted on a gear shaft, wherein the gear shaft comprises a shaft portion with a non-circular cross-section having two flat surfaces in respective planes parallel to a longitudinal axis of the gear shaft, wherein at least one of the first housing plate or the second housing plate comprises a receiving portion that directly mounts to the shaft portion with some play in such a manner that rotation of the gear shaft around the second axis of rotation with respect to the housing is substantially blocked by the two flat surfaces, wherein the respective outer flanges of the first housing plate and the second housing plate are provided with a circumferential ridge that is raised in a normal direction from respective surfaces of the respective outer flanges, wherein the circumferential ridge has an outer circumferential side surface for aligning the inner flange of the outer helical ring gear with the respective outer flanges, wherein the outer circumferential side surface has an outer diameter that is less than the inner diameter of the inner flange of the outer helical ring gear, wherein the circumferential ridge has an inner circumferential side surface that engages with the shaft portion of the gear shaft with the non-circular cross-section, and wherein a first height of the outer circumferential side surface in the normal direction from the respective surfaces of the respective outer flanges is less than a second height of the inner circumferential side surface in the normal direction from the respective surfaces of the respective outer flanges.

2. The differential gear assembly of claim 1, wherein the gear shaft is arranged completely within an interior of the housing between facing sides of the first housing plate and the second housing plate.

3. The differential gear assembly of claim 1, wherein the second axis of rotation (A2) intersects an external gear mesh of the outer helical ring gear.

4. The differential gear assembly of claim 3, wherein a plane (P) through the second axis of rotation (A2) and normal to the first axis of rotation (A1) divides the external gear mesh of the outer helical ring gear into two mesh portions of having substantially equal heights along the first axis of rotation (A1).

5. The differential gear assembly of claim 1, wherein the inner flange of the outer helical ring gear is held between the respective outer flanges of the first housing plate and the second housing plate, and wherein the inner flange is clamped between the respective outer flanges.

6. The differential gear assembly of claim 1, wherein the inner flange is provided with openings, wherein the respective outer flanges are provided with a number of through openings for bolts to connect the first housing plate and the second housing plate together, and wherein the through openings of the respective outer flanges are aligned with the openings in the inner flange of the outer helical ring gear.

7. The differential gear assembly of claim 1, wherein at least one of the first housing plate or the second housing plate are formed from a material comprising a ceramic material.

8. The differential gear assembly of claim 1, wherein facing sides of the first housing plate and the second housing plate are spaced apart from each other at a distance (h) by the inner flange of the outer helical ring gear.

9. The differential gear assembly of claim 1, wherein each of the first housing plate and the second housing plate comprises a first through-opening for passage of an axle for rotation fixed connection to one of the first pair of gears, and a second through-opening, wherein the first through-opening has a circumferential edge comprising a first diameter and the second through-opening has a circumferential edge comprising a second diameter which is larger than the first diameter, wherein the housing, when assembled, comprises an outward facing side and an opposite inward facing side which faces the first pair of gears and the second pair of gears, and wherein no other through-opening than the second through-opening has a dimension that allows passage of the first pair of gears and the second pair of gears from the outward facing side to the opposite inward facing side.

10. The differential gear assembly of claim 9, wherein the first housing plate, the second housing plate, and the inner flange of the outer helical ring gear together substantially seal off an interior of the housing except for at the first through-opening and the second through-opening.

11. The differential gear assembly of claim 1, wherein the outer helical ring gear comprises an external gear mesh with teeth, and wherein the teeth have tips which point radially outwards from the first axis of rotation (A1).

12. The differential gear assembly of claim 1, wherein teeth of the outer helical ring gear are machined from a monolithic block of material.

13. The differential gear assembly of claim 1, wherein a center of mass of the differential gear assembly substantially coincides with an intersection of the first axis of rotation (A1) and the second axis of rotation (A2).

14. Method for assembling a differential gear assembly, comprising:
  providing a first housing plate and a second housing plate having a substantially identical shape and size, wherein the first housing plate and the second housing plate comprise respective outer flanges having a substantially same outer diameter;
  providing a helical gear comprising an inner flange having a diameter that is smaller than the outer diameter of the respective outer flanges of the first housing plate and the second housing plate;
  arranging a first pair of gears and a second pair of gears in the first housing plate or the second housing plate in such a manner that each gear of the first pair of gears engages each gear of the second pair of gears;
  fixing the respective outer flanges of the first housing plate and the second housing plate relative to the inner flange of the helical gear to form a housing of the differential gear assembly, wherein each gear of the second pair of gears is rotatably mounted on a gear shaft, wherein the gear shaft comprises a shaft portion with a non-circular cross-section having two flat surfaces in respective planes parallel to a longitudinal axis of the gear shaft, wherein at least one of the first housing plate or the second housing plate comprises a receiving portion that directly mounts to the shaft portion with some play in such a manner that rotation of the gear shaft around the second axis of rotation with respect to the housing is substantially blocked by the two flat surfaces, wherein the respective outer flanges of the first housing plate and the second housing plate are provided with a circumferential ridge that is raised in a normal direction from respective surfaces of the respective outer flanges, wherein the circumferential ridge has an outer circumferential side surface for aligning the inner flange of the helical gear with the respective outer flanges, wherein the outer circumferential side surface has an outer diameter that is less than the inner diameter of the inner flange of the helical gear, wherein the circumferential ridge has an inner circumferential side surface that engages with the shaft portion of the gear shaft with the non-circular cross-section, and wherein a first height of the outer circumferential side surface in the normal direction from the respective surfaces of the respective outer flanges is less than a second height of the inner circumferential side surface in the normal direction from the respective surfaces of the respective outer flanges.

15. The method of claim 14, wherein the gear shaft is arranged completely within an interior of the housing between facing sides of the first housing plate and the second housing plate.

16. The method of claim 14, wherein the inner flange of the helical gear is held between the respective outer flanges of the first housing plate and the second housing plate, and wherein the inner flange is clamped between the respective outer flanges.

17. The method of claim 14, wherein the inner flange is provided with openings, wherein the respective outer flanges are provided with a number of through openings for bolts to connect the first housing plate and the second housing plate together, and wherein the through openings of the respective outer flanges are aligned with the openings in the inner flange of the helical gear.

18. The method of claim 14, wherein at least one of the first housing plate or the second housing plate are formed from a material comprising a ceramic material.

19. The method of claim 14, wherein facing sides of the first housing plate and the second housing plate are spaced apart from each other at a distance (h) by the inner flange of the helical gear.

20. The method of claim 14, wherein each of the first housing plate and the second housing plate comprises a first through-opening for passage of an axle for rotation fixed connection to one of the first pair of gears, and an opposite second through-opening, wherein the first through-opening has a circumferential edge comprising a first diameter and the second through-opening has a circumferential edge comprising a second diameter which is larger than the first diameter, wherein the housing, when assembled, comprises an outward facing side and an opposite inward facing side which faces the first pair of gears and the second pair of gears, and wherein no other through-opening than the second through-opening has a dimension that allows passage of the first pair of gears and the second pair of gears from the outward facing side to the opposite inward facing side.

\* \* \* \* \*